United States Patent [19]

Inukai et al.

[11] Patent Number: 4,761,246

[45] Date of Patent: Aug. 2, 1988

[54] OPTICALLY ACTIVE AZOXY COMPOUND AND LIQUID CRYSTAL COMPOSITION

[75] Inventors: Takashi Inukai; Shinichi Saito; Hiromichi Inoue; Kazutoshi Miyazawa; Kanetsugu Terashima; Mitsuyoshi Ichihashi, all of Yokohamashi, Japan

[73] Assignee: Chisso Corporation, Osaka, Japan

[21] Appl. No.: 821,546

[22] Filed: Jan. 22, 1986

[30] Foreign Application Priority Data

Feb. 9, 1985 [JP] Japan ................................ 60-23976

[51] Int. Cl.⁴ ...................... C09K 19/24; C09K 19/26; C07C 105/00; C07C 107/06
[52] U.S. Cl. ........................... 252/299.68; 252/299.01; 534/566; 534/577; 350/350 S
[58] Field of Search ...................... 252/299.68, 299.01; 534/566, 577, 649, 885; 350/350 S

[56] References Cited

U.S. PATENT DOCUMENTS

| | | | |
|---|---|---|---|
| 3,977,769 | 8/1976 | Tsukamoto et al. | 252/299.68 |
| 3,989,639 | 11/1976 | Yaguchi et al. | 252/299.68 |
| 4,016,094 | 4/1977 | Tsukamoto et al. | 252/299.68 |
| 4,613,209 | 9/1986 | Goodby et al. | 350/350 S |

FOREIGN PATENT DOCUMENTS

| | | | |
|---|---|---|---|
| 51-1426 | 1/1976 | Japan | 252/299.68 |
| 51-1425 | 1/1976 | Japan | 252/299.68 |
| 61-30561 | 2/1986 | Japan | 252/299.68 |
| 61-30562 | 2/1986 | Japan | 252/299.68 |

OTHER PUBLICATIONS

Tsukamoto et al, Japanese J. Applied Physics, 14(9), pp. 1307-1312 (1975).
Keller, Annalles Physique, 3, pp. 139-144 (1978).
Demus et al, Flussige Kristalle in Tabellen, pp. 144-145, 164-166 (1976).
Demus et al, Flussige Kristalle in Tabellen II, pp. 244-246, 259-261 (1984).
Gray et al, Liquid Crystals Plastic Crystals, vol. 1, pp. 103-152, (1974).
Goodby et al, Liquid Crystals Ordered Fluids, vol. 4, pp. 1-32, (1984).

*Primary Examiner*—Teddy S. Gron
*Assistant Examiner*—J. E. Thomas
*Attorney, Agent, or Firm*—Wenderoth, Lind & Ponack

[57] ABSTRACT

A novel liquid-crystalline, optically active compound exhibiting a chiral smectic phase and a chiral smectic liquid crystal composition containing the same are provided, which liquid-crystalline, optically active compound is a compound expressed by the formula

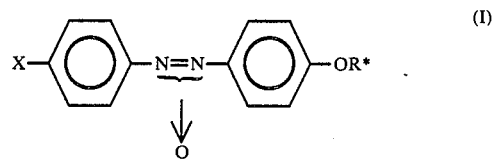
(I)

wherein X represents a linear chain alkyl group or a linear chain alkoxy group, each of 4 to 18 carbon atoms, or a halogen atom, R* represents an optically active alkyl group of 4 to 18 carbon atoms and

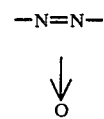

shows that the oxygen atom can be bonded to either nitrogen atom.

3 Claims, No Drawings

OPTICALLY ACTIVE AZOXY COMPOUND AND LIQUID CRYSTAL COMPOSITION

BACKGROUND OF THE INVENTION

1. Field of the Invention

This invention relates to a novel liquid crystal substance and more particularly it relates to an azoxy liquid crystal substance having an optically active group, and a chiral smectic liquid crystal composition containing the same.

2. Description of the Prior Art

A number of azoxy group- or azo group-containing liquid crystal substances have already been known, and it has also been well known that among these substances, those which exhibit nematic phase within a preferable temperature range can be used for TN (Twisted Nematic) type display mode.

On the other hand, as to optically active group-containing azoxy compounds and azo compounds, compounds expressed by the following formula (A) or (B) have been known:

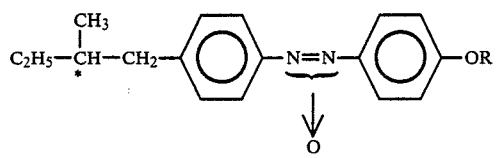
(A)

wherein R represents methyl, ethyl, propyl or butyl group (see Japanese patent publication Nos. Sho 53-36452/1978 and Sho 53-35937/1978); and

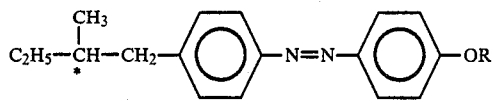
(B)

wherein R represents methyl, ethyl, propyl or butyl group (see Japanese patent publication Nos. Sho 53-36451/1978 and Sho 53-36453/1978). Among these compounds, however, the only one which has been shown to exhibit a liquid crystal phase is a compound of the formula (A) wherein R represents ethyl group (clearing point: 68° C.), and yet the liquid crystal phase which it exhibits is presumed to be cholesteric phase.

These nematic and cholesteric liquid crystal substances have been utilized for TN type display mode. As to liquid crystal display elements, TN type display mode has now been most widely employed, but TN type display elements are inferior in response speed to emissive display elements (such as electroluminescence, plasma display, etc.); hence various improvements therein have been attempted, but it does not appear that a large extent of improvement has been achieved. Thus, various liquid crystal display devices based on a different principle, in place of TN type display elements, have been attempted, and among them there is a display mode utilizing a ferroelectric liquid crystal (N. A. Clerk et al, Applied Phys. lett., 36, 899 (1980)). This mode utilizes the chiral smectic C phase (hereinafter abbreviated to SC* phase) or the chiral smectic H phase (hereinafter abbreviated to SH* phase), and it is preferred that such phases be present in the vicinity of room temperature.

The present inventors have searched for various azoxy compounds having an optically active group, mainly in order to develop liquid crystal substances suitable to such a mode, i.e. a light-switching mode utilizing ferroelectric liquid crystals, and as a result have found that novel optically active substances different from the above compounds of the formula (A) and the formula (B) exhibit a chiral smectic phase.

SUMMARY OF THE INVENTION

The present invention resides in
a liquid-crystalline, optically active compound expressed by the formula

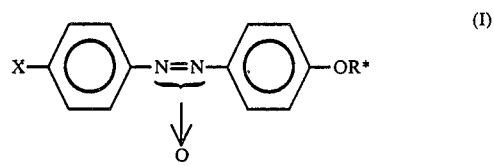
(I)

wherein X represents a linear chain alkyl group or a linear chain alkoxy group, each of 4 to 18 carbon atoms, or a halogen atom, R* represents an optically active alkyl group of 4 to 18 carbon atoms and

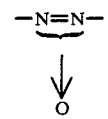

shows that the oxygen atom can be bonded to either nitrogen atom, and a chiral smectic liquid crystal composition, particularly a liquid crystal composition exhibiting chiral smectic C phase.

DESCRIPTION OF PREFERRED EMBODIMENTS

Unlike the above known compound (A), the compound of the formula (I) of the present invention exhibits a smectic phase. The reason for this difference is unclear, but is presumed to be due to the difference between the chemical structures of these compounds, that is, in the case of the compound of the formula (A), an optically active alkyl group is bonded directly to a benzene ring, whereas in the case of the compound of the formula (I) of the present invention, an optically active alkyl group is bonded to the benzene ring through an oxygen atom. Further, in the case of the formula (I) wherein X represents an alkoxy group, a chiral smectic C phase (SC* phase) is liable to appear, while in the case of the formula (I) wherein X represents an alkyl group, there is a tendency that the upper limit temperature of SC* phase is lower. Further, in the case where X represents a halogen atom, a tendency of exhibiting a smectic A phase (SA phase) is notable. On the other hand, in the case where X represents an optically active group, that is outside the scope of the present invention, formation of liquid crystal phase is extremely inhibited to exhibit no liquid crystal phase. Thus it can be seen that the relationship between the chemical structures and the crystalline properties is very delicate.

The phase transition points of the compounds of the formula (I) of the present invention are shown in Table 1.

TABLE 1

| Sample No. | In formula (I) X | In formula (I) R* | Phase transition point (°C.) C | SH* | SC* | SA | Ch | I |
|---|---|---|---|---|---|---|---|---|
| 1 | $C_4H_9O-$ | $C_2H_5-\overset{CH_3}{\underset{*}{CH}}-CH_2-$ | • 64 | — | — | — | • 87.5 | • |
| 2 | $C_8H_{17}O-$ | $C_2H_5-\overset{CH_3}{\underset{*}{CH}}-CH_2-$ | • 55 | — | • 68.5 | — | • 91 | • |
| 3 | $C_9H_{19}O-$ | $C_6H_{13}-\overset{CH_3}{\underset{*}{CH}}-$ | • 37 | — | (• 26.5) | — | • 46 | • |
| 4 | $C_{10}H_{21}O-$ | $C_2H_5-\overset{CH_3}{\underset{*}{CH}}-CH_2-$ | • 72 | — | • 75.5 | — | • 90 | • |
| 5 | $C_{11}H_{23}O-$ | $C_6H_{13}-\overset{CH_3}{\underset{*}{CH}}-$ | • 36 | — | • 41.5 | — | • 46 | • |
| 6 | $C_{12}H_{25}O-$ | $C_2H_5-\overset{CH_3}{\underset{*}{CH}}-CH_2-$ | • 71.5 | — | • 80 | — | • 88.5 | • |
| 7(Example 2) | $C_{12}H_{25}O-$ | $C_6H_{13}-\overset{CH_3}{\underset{*}{CH}}-$ | • 39.5 | — | • 47.8 | • 48.2 | • 50.4 | • |
| 8 | $C_{14}H_{29}O-$ | $C_3H_7-\overset{CH_3}{\underset{*}{CH}}-$ | • 27 | — | • 48 | • 54 | • 56 | • |
| 9 | $C_{14}H_{29}O-$ | $C_4H_9-\overset{CH_3}{\underset{*}{CH}}-$ | • 19 | — | • 50.5 | • 52 | — | • |
| 10 | $C_{16}H_{33}O-$ | $C_2H_5-\overset{CH_3}{\underset{*}{CH}}-CH_2-$ | • 51.5 | — | • 83 | • 86 | — | • |
| 11 | $C_{18}H_{37}O-$ | $C_6H_{13}-\overset{CH_3}{\underset{*}{CH}}-$ | • 38.5 | • 51 | • 57.5 | — | — | • |
| 12 | $C_{10}H_{21}-$ | $C_2H_5-\overset{CH_3}{\underset{*}{CH}}-CH_2-$ | • 20 | — | • 35 | • 40 | • 53 | • |
| 13 | $C_{14}H_{29}-$ | $C_2H_5-\overset{CH_3}{\underset{*}{CH}}-CH_2-$ | • 45 | — | (• 39.5) | • 56.5 | • 57.5 | • |
| 14 | $C_{14}H_{29}-$ | $C_6H_{13}-\overset{CH_3}{\underset{*}{CH}}-$ | • 19 | — | — | • 24.5 | — | • |
| 15(Example 1) | F | $C_2H_5-\overset{CH_3}{\underset{*}{CH}}-CH_2-$ | • 38 | — | — | (• 15) | (• 23.5) | • |
| 16 | F | $C_6H_{13}-\overset{CH_3}{\underset{*}{CH}}-$ | • 38.5 | — | — | — | — | • |

TABLE 1-continued

| | In formula (I) | | \multicolumn{6}{c}{Phase transition point (°C.)} | | | | | |
|---|---|---|---|---|---|---|---|---|
| Sample No. | X | R* | C | SH* | SC* | SA | Ch | I |
| 17 | Cl | C₂H₅—CH—CH₂— with CH₃ branch (*) | • 81 | — | — | (• 72) | — | • |
| 18 | Cl | C₆H₁₃—CH— with CH₃ branch (*) | • 46 | — | — | — | — | • |
| 19 | Br | C₂H₅—CH—CH₂— with CH₃ branch (*) | • 83 | — | — | (• 75) | — | • |
| 20 | Br | C₆H₁₃—CH— with CH₃ branch (*) | • 45.5 | — | — | — | — | • |

All the compounds shown in Table 1 are mixtures of compounds of

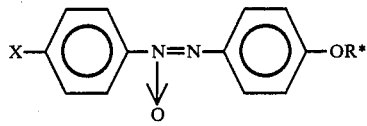

with those of

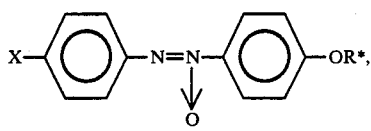

and their phase transition points somewhat vary depending on variation of the mixing proportions of both the compounds.

The substance of the formula (I) of the present invention exhibits ferroelectric properties in SC* phase, and its spontaneous electric polarization value is large to a practically sufficient extent. As to the spontaneous polarization value, when the asymmetric carbon atom is positioned as the third atom counting from the benzene ring, as in the case where R* in the formula (I) is

then the spontaneous polarization value is several nC/cm². Further, when the asymmetric carbon atom is positioned as the second atom counting from the benzene ring, as in the case where R* is

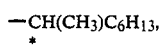

then the spontaneous polarization value is larger by about one figure than the above numerical value. In general, larger spontaneous polarization values are preferred for the high speed response and low voltage drive of light switching elements.

Further, the compound of the formula (I) has a superior compatibility with compounds exhibiting SC* phase, SH* phase or cholesteric phase; hence when the compound is blended therewith, it can be used for broadening the temperature range where the SC* phase is exhibited.

When a SC* liquid crystal composition is constituted, it is possible to constitute it from only a plurality of the compounds of the formula (I). Further it is also possible to blend the substance of the formula (I) with a substance containing no optically active group and hence exhibiting SC phase to constitute a SC* liquid crystal composition.

Display elements exhibiting the light-switching effect of SC* phase have the following three superior specific features as compared with those of TN display mode:

The first specific feature is that the display elements reply at a very high rate so that the response time is 1/100 or less of those of conventional TN mode display elements. The second specific feature is that there is a memory effect so that the multiplex drive is easy in combination thereof with the above high rate response properties. The third specific feature is that when the gray scale is given in the case of TN display mode, this is effected by adjusting the impressed voltage, but there are raised difficult problems such as temperature dependency of threshold voltage, voltage dependency of response rate, etc.; whereas when the light-switching effect of SC* phase is applied, it is possible to readily obtain the gray scale by adjusting the reverse time of polarity and hence the display elements are very suitable to graphic display.

As to the display method, the following two may be considered:

One method is of birefringence type using two plates of polarizers and another is of guest-host type using a dichloric dyestuff. Since SC* phase has a spontaneous polarization, the molecule is reversed around the helical axis as a rotating axis by reversing the polarity of impressed voltage. When a liquid crystal composition having SC* phase is filled in a liquid crystal display cell subjected to aligning treatment so that the liquid crystal molecules can be aligned in parallel to the electrode surface, followed by placing the liquid crystal cell between two plates of polarizers arranged so that the director of the liquid crystal molecules can be in parallel to the polarization plane on one side, impressing a voltage and reversing the polarity, then a bright field of view and a dark field of view are obtained depending on the opposition angle of the polarizers. On the other hand, in the case of operation by way of the guest-host type, it is possible to obtain a bright field of view and a colored field of view (depending on the arrangement of the polarization plate), by reversing the polarity of impressed voltage.

In general, it is difficult to align liquid crystal molecules in parallel to the wall surface of glass plate in the smectic state thereof; hence liquid crystal molecules have been aligned by very slowly cooling the molecules starting from the isotropic liquid thereof (1° C. ~2° C./hr) in a magnetic field of several tens gausses or more. But, in the case of a liquid crystal substance exhibiting the cholesteric phase thereof in a temperature range higher than the temperature at which the smectic phase is exhibited, it is possible to easily obtain a uniformly aligned monodomain state, by cooling the molecules from the temperature at which the cholesteric phase thereof is exhibited, down to the temperature at which the smectic phase is exhibited, at a cooling rate of 1° C./min., while impressing a direct current voltage of 50 to 100 V in place of the magnetic field.

In addition, racemic form compounds corresponding to the compound of the formula (I) may be similarly prepared by replacing the optically active alcohol used as a raw material in the preparation of the optically active substance (I), as shown below, by racemic form alcohols corresponding thereto, and the resulting racemic form compounds exhibit almost the same phase transition points as those in the case of (I), although they exhibit non-chiral liquid crystal phase.

Further, since the compound of the formula (I) contains an optically active carbon atom, it has a capability of inducing a twisted structure when added to a nematic liquid crystal. A nematic liquid crystal having a twisted structure, i.e. a chiral nematic liquid crystal, does not form the so-called reverse domain of TN type display elements; hence it is possible to use the compound of the formula (I) as an agent for preventing the reverse domain from forming.

In addition, among the raw material optically active 2-alkanols used in the preparation of the compound of the present invention, as described below, S(+)-2-octanol and R(−)-2-octanol are readily commercially available, but other optically active 2-alkanols are at present unsuitable for use in a large quantity. The present inventors used as raw material, products obtained by subjecting racemic substances to optical resolution according to the literature (R. H. Pickard et al, J. Chem. Soc., 99, 45 (1911)), and by using the thus obtained optically active 2-alkanols, it is possible to obtain various compounds of the formula (I) having different kinds of R. However, change in the liquid crystal phase transition points depending on the chain length of R is slight; hence there is no particular advantage to use as raw material, optically active 2-alkanols other than 2-octanol which is most readily commercially available.

Preparation of the compound

The compound of the formula (I) of the present invention may be preferably prepared via the following reaction scheme:

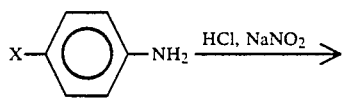

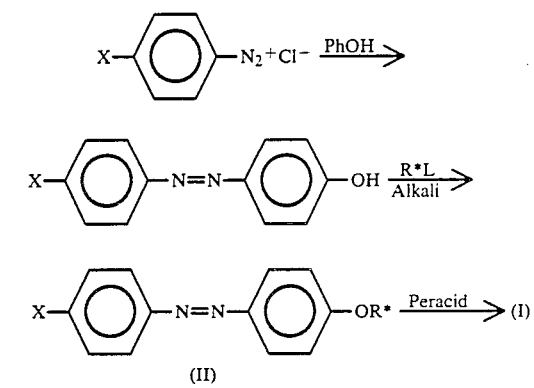

In the above scheme, X and R* are as defined in the formula (I) and L represents a group to be eliminated such as Cl⁻, Br⁻, TsO⁻, etc. (note: Ts represents tosyl group).

Further, in the case where X in the formula (I) represents an alkoxy group, the following passageway may be chosen as the steps through which the compound of the formula (II) is obtained:

The step of reacting a peracid with the compound of the formula (II) to obtain the compound of the formula (I) is carried out in a suitable solvent, and as such a solvent, those which do not react with peracids, that is, any of acids such as acetic acid, hydrocarbons such as hexane, hydrocarbons such as benzene, etc. may be preferably used. Further, as the peracids, aliphatic peracids such as peracetic acid, perisobutyric acid, etc., aromatic peracids such as perbenzoic acid, m-chloroperbenzoic acid, etc. may be used.

In addition, the intermediate azo compound of the formula (II) also has liquid crystal properties although phase transition points of the compounds of the formula (II) are shown in Table 2.

TABLE 2

| Sample No. | In formula (II) X | R* | Phase transition point (°C.) C | SC* | SA | Ch | I |
|---|---|---|---|---|---|---|---|
| 21 | $C_8H_{17}O-$ | $C_2H_5-\overset{CH_3}{\underset{*}{CH}}-CH_2-$ | • 72 | — | — | • 79.5 | • |
| 22 | $C_{12}H_{25}O-$ | $C_2H_5-\overset{CH_3}{\underset{*}{CH}}-CH_2-$ | • 88.5 | — | — | — | • |
| 23 | $C_{16}H_{33}O-$ | $C_2H_5-\overset{CH_3}{\underset{*}{CH}}-CH_2-$ | • 80.5 | (• 76) | — | — | • |
| 24 | $C_{12}H_{25}O-$ | $C_6H_{13}-\overset{CH_3}{\underset{*}{CH}}-$ | • 49 | (• 38) | — | — | • |
| 25 | $C_{14}H_{29}-$ | $C_6H_{13}-\overset{CH_3}{\underset{*}{CH}}-$ | • 21.5 | — | — | (• 8) | • |
| 26 | $C_{14}H_{29}-$ | $C_2H_5-\overset{CH_3}{\underset{*}{CH}}-CH_2-$ | • 47 | — | (• 38) | (• 41) | • |
| 27 | $C_{10}H_{21}-$ | $C_2H_5-\overset{CH_3}{\underset{*}{CH}}-CH_2-$ | • 34 | (• 32.5) | — | — | • |
| 28 | $C_{14}H_{29}O-$ | $C_4H_9-\overset{CH_3}{\underset{*}{CH}}-$ | • 38 | • 39 | • 43 | — | • |
| 29 | $C_{14}H_{29}O-$ | $C_3H_7-\overset{CH_3}{\underset{*}{CH}}-$ | • 41 | (• 38) | • 42 | • 45 | • |
| 30 | F | $C_2H_5-\overset{CH_3}{\underset{*}{CH}}-CH_2-$ | • 65 | — | — | — | • |
| 31 | F | $C_6H_{13}-\overset{CH_3}{\underset{*}{CH}}-$ | • 66 | — | — | — | • |
| 32 | Cl | $C_6H_{13}-\overset{CH_3}{\underset{*}{CH}}-$ | • 88 | — | — | — | • |
| 33 | Br | $C_2H_5-\overset{CH_3}{\underset{*}{CH}}-CH_2-$ | • 109 | — | — | — | • | the tendency toward formation of liquid crystal phases is weaker than that in the case of the compound of the formula (I). Further, some of the azo compounds of the formula (II) exhibit a chiral smectic liquid crystal phase or other liquid crystal phases; hence it can be said that the azo compounds have higher liquid crystal properties than those of the above-mentioned azo compounds (B) having no liquid crystal phase. Thus, the compounds of the formula (II) can also be used as a component constituting a chiral smectic liquid crystal composition or a cholesteric liquid crystal composition. The The present invention will be described in more detail by way of Examples.

EXAMPLE 1

Preparation of optically active 4-fluoro-4'-(2-methyl-butyloxy)-azoxybenzene (a compound of the formula (I) wherein X=F and

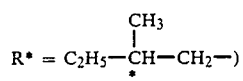

(sample No. 15)

(i) Preparation of optically active 4-fluoro-4'-(2-methyl-butyloxy)-azobenzene (sample No. 30)

A saturated aqueous solution of sodium nitrite (18.6 g) was dropwise added to a mixture consisting of commercially available p-fluoroaniline (30 g), conc. hydrochloric acid (62 ml) and water (40 ml) to prepare a diazonium solution, which was then added to a solution consisting of phenol (25.5 g), NaOH (37.5 g), water (270 ml) and acetic acid (135 ml) to effect azo-coupling, followed by recrystallizing the resulting product from toluene and then from aqueous ethanol to obtain crystals (33 g) having a m.p. of 154.8–155.3° C. This product is 4-fluoro-4'-hydroxy-azobenzene.

This substance (10.1 g) was heated with an ester of S(−)-2-methyl-1-butanol with p-toluenesulfonic acid

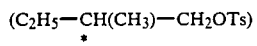

(12.6 g) in ethanol (40 ml) in the presence of KOH (3 g) under reflux with stirring for 5 hours to effect etherification, followed by recrystallization from ethanol to obtain 4-fluoro-4'-(2-methylbutyloxy)-azobenzene (sample No. 30) (8 g) (m.p.: 64.3–65.0° C.). With this product per se, no liquid crystal phase could be observed.

(ii) Preparation of the captioned compound
4-Fluoro-4'-(2-methyl-butyloxy)-azobenzene (3.6 g) obtained in the above paragraph (i) was dissolved in toluene (25 ml), followed by adding to the solution, a solution of m-chloro-perbenzoic acid (2.8 g) in toluene (25 ml), allowing the mixture to stand at room temperature overnight, adding a 2N aqueous solution of NaOH to the resulting bright-yellow reaction fluid having deposited m-chloro-benzoic acid, to extract and remove the remaining excess m-chloro-perbenzoic acid and the reaction product, m-chloro-benzoic acid, washing the toluene layer with water, distilling off toluene, and recrystallizing from ethanol to obtain the objective product (2.8 g). This product becomes an isotropic liquid at a m.p. of 38.0° C., and exhibits a choresteric phase at 23.5° C. and SA phase at 15.0° C. through monotropic phase transition.

EXAMPLE 2

Preparation of optically active 4'-dodecyloxy-4'-(1-methyl-heptyloxy)-azoxybenzene (a compound of the formula (I) wherein X=$C_{12}H_{25}O-$ and

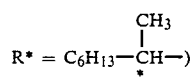

(sample No. 7)

(i) Preparation of azobenzene
Benzylidene-p-hydroxyaniline as a known substance (m.p.: 185° C.) (140 g) was dissolved in ethanol (700 ml) containing KOH (43 g), followed by dropwise adding S(+)-2-octyl p-toluenesulfonate (218 g) at 70° C., heating the mixture under reflux for 20 hours, adding a 5% aqueous solution of NaHCO$_3$ (50 ml), water (200 ml) and toluene (800 ml), separating the toluene layer, washing with a 2N aqueous solution of NaOH, distilling off toluene and recrystallizing from ethanol to obtain optically active benzylidene-p-(1-methyl-heptyloxy)aniline (m.p. 47.3° C.)(105 g).

The absolute steric configuration of this substance is unclear, but since it may be considered that Walden inversion occurred at the above etherification step, the absolute steric configuration is presumed to be of R.

6N-Hydrochloric acid (120 ml) was added to the above benzylideneaniline (102 g), followed by distilling off benzaldehyde by passing steam, making the residual solution alkaline with NaOH, taking out optically active p-(1-methyl-heptyloxy)-aniline and purifying it by vacuum distillation. B.p. 123–125° C./1.5 mmHg; yield 63.5 g; angle of rotation $[\alpha]_D^{21} = -5.3°$ (in ethanol).

This p-(1-methyl-heptyloxy)-aniline (43 g) was diazotized in the presence of hydrochloric acid in the same manner as in Example 1 to effect azo-coupling with phenol to thereby prepare 4-(1-methyl-heptyloxy)-4'-hydroxy-azobenzene. This product was impossible to crystallize; thus it was used as it was, that is, as crude product in the next step.

The above crude product of 4-(1-methyl-heptyloxy)-4'-hydroxy-azobenzene (16.5 g) was heated with lauryl bromide (16 g) in ethanol in the presence of KOH (3.6 g) under reflux for 10 hours, followed by passing a toluene solution of the product through an alumina chromatographic column and recrystallizing from heptane to obtain 4'-dodecyloxy-4'-(1-methyl-heptyloxy)-azobenzene (sample No. 24).

This product had a m.p. (C-I transition point) of 49° C., and exhibited a monotropic SC*-I point of 38° C. Further, the spontaneous polarization of the metastable SC* phase thereof was 20.0 nC/cm$^2$ at 36° C.

(ii) Preparation of the captioned compound
4'-Dodecyloxy-4'-(1-methyl-heptyloxy)-azobenzene (7 g) obtained in the above paragraph (i) was added to a mixed solution of acetic anhydride (80 ml), acetic acid (20 ml) and 30% hydrogen peroxide (4 g), followed by agitating the mixture at about 40° C. for 7 hours, further adding 30% hydrogen peroxide (4 g), agitating for 7 hours, adding water, agitating for 3 hours, extracting the resulting material with benzene, purifying by passing through an alumina chromatographic column and recrystallizing from ethanol containing ethyl acetate to obtain the objective product (5.2 g).

This product exhibited a C-SC* point of 39.5° C., a SC*-SA point of 47.8° C., a SA-Ch point of 48.2° C. and a Ch-I of 50.4° C. The spontaneous polarization of SC* phase (metastable state) at 24° C. was 30.1 nC/cm$^2$.

For comparison, a compound of the formula (I) wherein

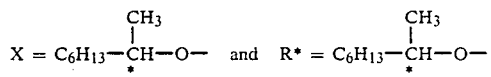

was prepared. The resulting product was a yellow oily product and even when it was allowed to stand in dry ice, it exhibited no liquid crystal phase.

EXAMPLE 3 (USE EXAMPLE 1)

A nematic liquid crystal composition consisting of

| | |
|---|---|
| 4-ethyl-4'-cyanobiphenyl | 20% by weight, |
| 4-pentyl-4'-cyanobiphenyl | 40% by weight, |
| 4-octyloxy-4'-cyanobiphenyl | 25% by weight and |
| 4-pentyl-4'-cyanoterphenyl | 15% by weight, | was filled in a cell composed of two opposed substrates each having a transparent electrode coated with polyvinyl alcohol (PVA) as an aligning agent and subjected to rubbing treatment on the surface to effect parallel aligning treatment, and having a distance between the electrodes of 10 μm, to prepare a TN type display cell, which was then observed under a polarizing microscope. As a result, formation of a reverse twist domain was observed.

To the above nematic liquid crystal composition was added a compound of the formula (I) of the present invention wherein X=F and

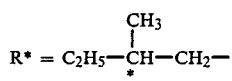

$$R^* = C_2H_5-\underset{*}{CH}-CH_2-$$

(sample No. 15) in a quantity of 1% by weight, and the resulting composition was filled in the same cell as above and the TN cell was similarly observed. As a result, the reverse twist domain was dissolved and a uniform nematic phase was observed.

EXAMPLE 4 (USE EXAMPLE 2)

Using an optically active azoxy compound of the formula (I) of the present invention and an optically active azo compound of the formula (II), a liquid crystal composition consisting of the following compounds was prepared:

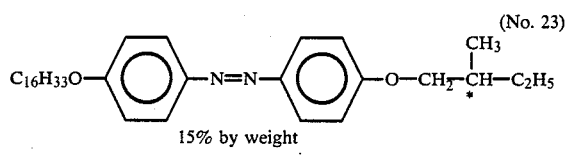

(No. 23)

15% by weight

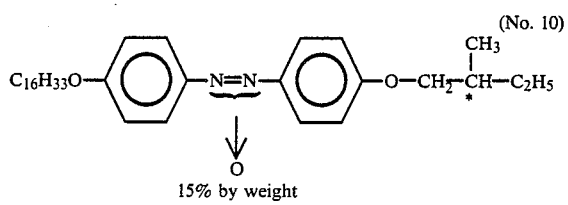

(No. 10)

15% by weight

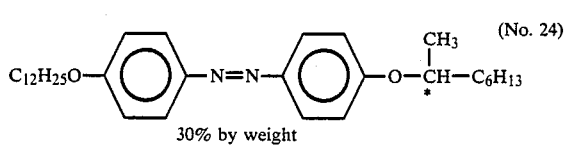

(No. 24)

30% by weight

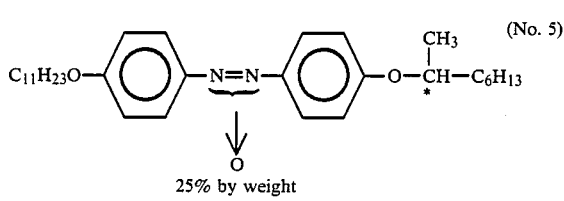

(No. 5)

25% by weight

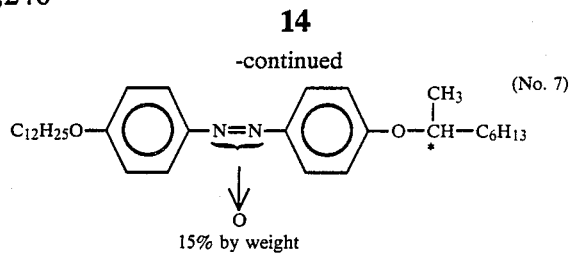

(No. 7)

15% by weight

The above composition may be prepared by weighing definite quantities of the above 5 kinds of liquid crystal compounds and heating and dissolving them in a sample bottle to blend them.

From the resulting composition was prepared a liquid crystal element for tests. Namely, a PVA film was coated on two opposed glass substrates each provided with a transparent electrode of indium oxide, and the resulting substrates were subjected to rubbing treatment in a definite direction. Further, glass fibers of 4 μm in diameter as a spacer were set so that the respective rubbing directions of the two substrates might be in parallel to each other to compose a liquid crystal cell, followed by sealing the above liquid crystal composition in the cell in vacuo. The resulting liquid crystal element was provided between two crossed polarizers and an electric field was impressed. As a result, change in the intensity of transmitted light was observed through impression of 20V.

Response time was sought through the change in the intensity of transmitted light at that time, to exhibit a value of about 0.9 msec at 25° C. The contrast ratio was 1:20.

Further, with the above liquid crystal composition, the temperature change of its texture was observed under a polarizing microscope. As a result, it was found that the composition formed a ferroelectric liquid crystal within the temperature range of 10° to 51° C. The value of its spontaneous polarization was 18 nC/cm² at 25° C.

EXAMPLE 5 (USE EXAMPLE 3)

Using optically active azoxy compounds of the formula (I) of the present invention and optically active compounds of the formula (II), a liquid crystal composition consisting of the following compounds was prepared in the same manner as in Example 4:

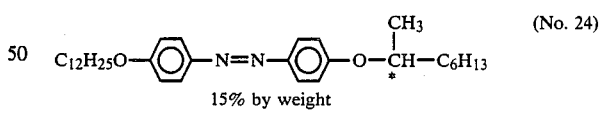

(No. 24)

15% by weight

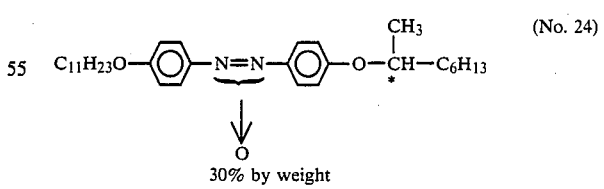

(No. 24)

30% by weight

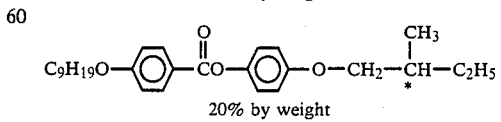

20% by weight

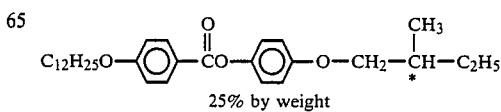

25% by weight

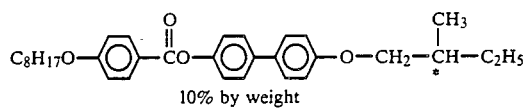

10% by weight

To the resulting liquid crystal composition was added an anthraquinone dyestuff D-16 (tradename of a product made by BDH Company) as a dichroic dyestuff in a quantity of 3% by weight to prepare a composition of the so-called guest-host type, which was then sealed in the same cell as in Example 4 (cell thickness: 6 μm). Using a polarizing plate, an electric field was impressed. As a result, change in the intensity of transmitted light was observed through impression of 20V.

Response time was sought through the change in the intensity of transmitted light at that time, to exhibit a value of about 2 m sec at 25° C.

Further, with the above liquid crystal composition, the temperature change of its texture was observed under a polarizing microscope. As a result, it was found that the composition formed a ferroelectric liquid crystal within the temperature range of 0° to 46° C. The value of its spontaneous polarization was 11 nC/cm² at 25° C.

What we claim is:

1. A liquid crystalline, optically active compound expressed by the formula

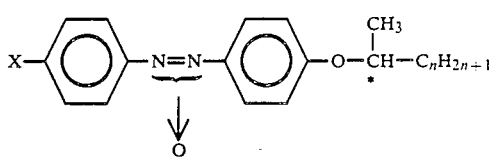

wherein x represents a linear chain alkoxy group of 9 to 18 carbon atoms, and n represents an integer of 3 to 6.

2. A liquid-crystalline, optically active compound according to claim 1 wherein n is 6.

3. A chiral smectic liquid crystalline composition having at least two components, at least one of which is a liquid crystalline compound as set forth in claim 1.

* * * * *